US008527684B2

(12) United States Patent
Kothamasu

(10) Patent No.: US 8,527,684 B2
(45) Date of Patent: Sep. 3, 2013

(54) CLOSED LOOP DYNAMIC INTERCONNECT BUS ALLOCATION METHOD AND ARCHITECTURE FOR A MULTI LAYER SOC

(75) Inventor: Srinivasa Rao Kothamasu, Prakasam District (IN)

(73) Assignee: LSI Corporation, San Jose, CA (US)

( * ) Notice: Subject to any disclaimer, the term of this patent is extended or adjusted under 35 U.S.C. 154(b) by 280 days.

(21) Appl. No.: 12/944,762

(22) Filed: Nov. 12, 2010

(65) Prior Publication Data

US 2012/0124260 A1 May 17, 2012

(51) Int. Cl.
*G06F 12/00* (2006.01)
*G06F 13/00* (2006.01)

(52) U.S. Cl.
USPC .......................... 710/110; 710/107; 710/244

(58) Field of Classification Search
USPC .......................... 710/110, 107, 244
See application file for complete search history.

(56) References Cited

U.S. PATENT DOCUMENTS

| | | | | | |
|---|---|---|---|---|---|
| 6,034,542 | A | * | 3/2000 | Ridgeway | 326/39 |
| 6,108,721 | A | * | 8/2000 | Bryg et al. | 710/22 |
| 6,122,690 | A | * | 9/2000 | Nannetti et al. | 710/311 |
| 6,467,000 | B1 | * | 10/2002 | Reinders | 710/68 |
| 6,691,193 | B1 | * | 2/2004 | Wang et al. | 710/200 |
| 6,877,053 | B2 | * | 4/2005 | Lahiri et al. | 710/113 |
| 7,577,780 | B2 | * | 8/2009 | Huang et al. | 710/116 |
| 7,685,344 | B2 | * | 3/2010 | Fujiwara et al. | 710/113 |
| 7,934,046 | B2 | * | 4/2011 | Butter et al. | 710/317 |
| 7,937,520 | B2 | * | 5/2011 | Lin et al. | 710/315 |
| 8,176,386 | B1 | * | 5/2012 | Sutardja et al. | 714/763 |
| 8,213,461 | B2 | * | 7/2012 | Croxford | 370/498 |
| 2008/0022140 | A1 | * | 1/2008 | Yamada et al. | 713/322 |
| 2008/0046619 | A1 | * | 2/2008 | Miller | 710/110 |
| 2012/0089759 | A1 | * | 4/2012 | Shirlen et al. | 710/113 |

\* cited by examiner

*Primary Examiner* — Paul R Myers
*Assistant Examiner* — Christopher A Daley
(74) *Attorney, Agent, or Firm* — Mendelsohn, Drucker & Dunleavy, P.C.; Steve Mendelsohn

(57) ABSTRACT

A closed loop dynamic interconnect bus allocation method and architecture for a multi layer SoC is disclosed. In one embodiment, a system on chip (SoC) includes multiple masters, multiple slaves, multiple buses, and an interconnect module coupled to multiple masters and multiple slaves via multiple buses. The interconnect module includes an arbiter. The SoC also includes an inner characteristic bus coupled to the plurality of masters, the plurality of slaves and the interconnect module. The interconnect module receives on-chip bus transactions substantially simultaneously from the multiple masters to be processed on one or more of the multiple slaves via the multiple buses. The interconnect module also receives inner characteristic information of the on-chip bus transactions via the inner characteristic bus. Further, the interconnect module allocates the received on-chip bus transactions from the multiple masters to associated one or more of multiple slaves based on the received inner characteristic information.

16 Claims, 6 Drawing Sheets

200

| | CY0 | CY1 | CY2 | CY3 | CY4 | CY5 | CY6 | CY7 |
|---|---|---|---|---|---|---|---|---|
| S0 | M00 | M10 | M20 | | | | | M03 |
| S1 | M20 | M01 | M01 | M11 | | M02 | M02 | |

SECTION 1: ROUND ROBIN ARBITRATION

| | CY0 | CY1 | CY2 | CY3 | CY4 | CY5 | CY6 | CY7 |
|---|---|---|---|---|---|---|---|---|
| S0 | M0 | M1 | M2 | M0 | M1 | M2 | M0 | M1 |
| S1 | M0 | M1 | M1 | M2 | M0 | M1 | M1 | M2 |

SECTION 2: PREFERRED MASTER

| M0(TRANS NO.) | 0 | 1 | 1 | | | 2 | 2 | 3 |
|---|---|---|---|---|---|---|---|---|
| STG1 | S0_32_1 | S1_32_2 | S1_32_2 | | | S1_64_1 | S1_64_1 | S0_64_1 |
| STG0 | S1_32_2 | | | | S1_64_1 | S0_64_1 | S0_64_1 | |

| M1(TRANS NO.) | 0 | 0 | 1 | 1 | | | | |
|---|---|---|---|---|---|---|---|---|
| STG1 | S0_64_1 | S0_64_1 | S1_64_1 | S1_64_1 | | | | |
| STG0 | S1_64_1 | S1_64_1 | | | | | | |

| M2(TRANS NO.) | 0 | 1 | 1 | | | | | |
|---|---|---|---|---|---|---|---|---|
| STG1 | S1_32_1 | S0_32_1 | S0_32_1 | | | | | |
| STG0 | S0_32_1 | | | | | | | |

SECTION 3: PIPELINE FLOW IN MASTERS

| | CY0 | CY1 | CY2 | CY3 | CY4 | CY5 | CY6 | CY7 |
|---|---|---|---|---|---|---|---|---|
| S0 | 0 | 0 | 0 | 0 | 0 | 0 | 0 | 0 |
| S1 | 0 | 0 | 0 | 1 | 2 | 2 | 1 | 1 |

SECTION 4: PENDING TRANSACTION STATUS IN SLAVES

FIG. 2

|     | CY0 | CY1 | CY2 | CY3 | CY4 | CY5 | CY6 | CY7 |
|-----|-----|-----|-----|-----|-----|-----|-----|-----|
| S0  | M10 | M00/M20 |  |  |  |  |  |  |
| S1  | M20 | M11 | M01 |  |  | M02 | M03 |  |

SECTION 1: CLOSED LOOP ARBITRATION

| M0(TRANS NO.) | 0 | 1 | 1 |  |  | 2 | 3 |  |
|---|---|---|---|---|---|---|---|---|
| STG1 | S0_32_1 | S0_32_1 | S1_64_1 |  |  | S0_64_1 | S1_64_1 |  |
| STG0 | S1_32_2 | S1_32_2 |  |  | S1_64_1 | S1_64_1 |  |  |

| M1(TRANS NO.) | 0 | 1 |
|---|---|---|
| STG1 | S0_64_1 | S1_64_1 |
| STG0 | S1_64_1 |  |

| M2(TRANS NO.) | 0 | 1 |
|---|---|---|
| STG1 | S1_32_1 | S0_32_1 |
| STG0 | S0_32_1 |  |

SECTION 2: PIPELINE FLOW IN MASTERS

| S0 | 0 | 0 | 0 | 0 | 0 | 0 | 0 | 0 |
|----|---|---|---|---|---|---|---|---|
| S1 | 0 | 0 | 1 | 2 | 2 | 2 | 1 | 1 |

SECTION 3: PENDING TRANSACTION STATUS IN SLAVES

FIG. 5

CLOSED LOOP DYNAMIC INTERCONNECT BUS ALLOCATION METHOD AND ARCHITECTURE FOR A MULTI LAYER SOC

FIELD OF TECHNOLOGY

Embodiments of the present subject matter relate to the field of system on chip (SoC). More particularly, embodiments of the present subject matter relate to a bus allocation method and architecture in a multilayer SoC.

BACKGROUND

In a typical SoC, different interfaces, for example, master interfaces and slave interfaces are interacted through buses. The buses may be point-to-point buses or shared buses. The point-to-point bus is a direct connection between two interfaces and offers highest possible performance. However, it is always not viable to accommodate all the point-to-point buses with the given product requirements.

In shared buses, bus bandwidth is shared among multiple interfaces. These are more commonly used buses compared to point-to-point buses. Allocation of the bus bandwidth to the different interfaces varies based on application requirements. Often, this is done through priority based algorithms like fixed priority, round-robin, and the like. These algorithms do bandwidth allocation at a transaction level by considering outer characteristics of the interfaces like data width, transfer size, and the like. Since, for the interfaces, the outer characteristics are not completely linked to inner characteristics, bus bandwidth allocation through priority based algorithms may not be efficient and well-organized.

SUMMARY

A closed loop dynamic interconnect bus allocation method and architecture for a multi layer SoC is disclosed. According to one aspect of the present subject matter, a method includes allocating on-chip bus transactions between multiple masters and one or more of multiple slaves in a system on chip (SoC) using inner characteristic information of the on-chip bus transactions based on the multiple masters and the multiple slaves. The method also includes sending a feedback associated with the allocation based on the inner characteristic information to the multiple masters in the SoC.

According to another aspect of the present subject matter, a non-transitory computer-readable storage medium for allocating on-chip bus transactions between multiple masters and multiple slaves in an SoC, has instructions that, when executed by a computing device causes the computing device to perform the method described above.

According to yet another aspect of the present subject matter, an SoC includes multiple masters, multiple slaves, multiple buses, an interconnect module coupled to the multiple masters and the multiple slaves via the multiple buses, and an inner characteristic bus coupled to the multiple masters, the multiple slaves and the interconnect module. The interconnect module receives on-chip bus transactions substantially simultaneously from the multiple masters to be processed on one or more of the multiple slaves via the multiple buses.

The interconnect module also receives inner characteristic information of the on-chip bus transactions based on the multiple masters and the one or more of the multiple slaves via the inner characteristic bus. Further, the interconnect module allocates the received on-chip bus transactions from the multiple masters to associated one or more of the multiple slaves based on the received inner characteristic information of the on-chip bus transactions.

The methods, and systems disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein:

FIG. 2 illustrates a bus allocation process through traditional round robin arbitration, in the context of the invention;

FIG. 5 illustrates the on-chip bus transactions allocation using the closed loop dynamic interconnect architecture of the SoC shown in FIG. 4, according to one embodiment.

The drawings described herein are for illustration purposes only and are not intended to limit the scope of the present disclosure in any way.

DETAILED DESCRIPTION

A closed loop dynamic interconnect bus allocation method and architecture for a multi layer SoC is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The terms 'master' and 'master interface' are used interchangeably throughout the document. Similarly, the terms 'slave' and 'slave interface' are used interchangeably throughout the document.

Figure 1:
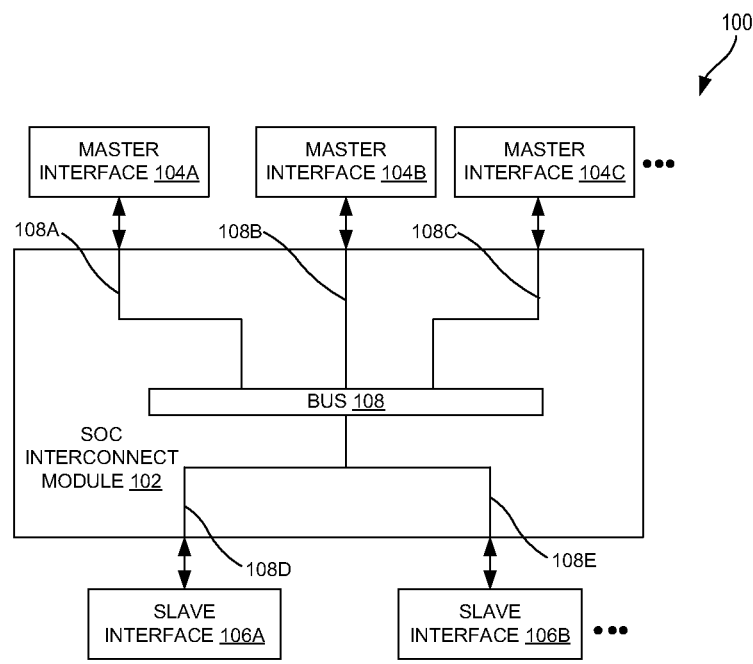
FIG. 1 illustrates a multi layer system on chip (SoC) interconnect, in the context of the invention.

FIG. 1 illustrates a multi layer system on chip (SoC) interconnect module 102, in the context of the invention. As shown, FIG. 1 includes the SoC interconnect module 102 with three master interfaces 104A-C and two slave interfaces 106A-B connected via multiple buses 108A-E. Each of the master interfaces 104A-C has a pipeline depth of two internally. Similarly, each of the slave interfaces 106A-B support buffering of up to two pending transactions. The SoC interconnect module 102 operates on 64 bit data width and supports transaction flow to both the slave interfaces 106A-B in parallel.

FIG. 2 illustrates a bus allocation process through traditional round robin arbitration, in the context of the invention. FIG. 2 shows four sections. Section 1 shows round robin arbitration where there is one granted master interface for each slave interface in a given cycle. The round robin arbitration supports accessing of two slave interfaces in parallel. In FIG. 2, $M_{xy}$ represents a master interface $M_x$ (e.g., any one of the master interfaces 104A-C) performing a transaction y, where y is 0, 1, 2 . . . n. Section 2 shows a preferred master where there is a default master interface to allocate a bus for each of the slave interfaces 106A-B. Default master interface allocation changes to a next master interface (e.g., master interface 104A—master interface 104B—master interface 104C—master interface 104A) on each active arbitration cycle.

Section 3 shows inner characteristic information from the three master interfaces 104A-C. In each of the master interfaces 104A-C, stage 1 (STG1) pipe interacts to outer part of the master interface and STG0 pipe is closely attached to an inner logic. Transaction in STG1 is used for requesting a bus. Here, transaction Sx_y_z represents transaction to a slave interface $S_x$, with y data width and z burst size. Section 4 describes pending transaction status in each of the slave interfaces 106A-B. Each of the slave interfaces 106A-B accepts up to two pending transactions. This status may be incremented when a transaction issued in previous cycle is not absorbed immediately.

In cycle 0 (CY0), the master interface 104A and the master interface 104B are competing for the slave interface 106A. Since, the master interface 104A is the preferred master, it is allocated the bus to access the slave interface 106A. For the slave interface 106B, though the preferred master is the master interface 104A, since there is no request from the master interface 104A, the master interface 104C is allocated the bus as per round robin order. Both the slave interfaces 106A-B absorbed transactions in CY0 immediately, and hence, pending transaction status in CY1 for both the slave interfaces 106A-B stand at 0.

In CY1 and CY2, the master interface 104B and the master interface 104C are allocated for accessing the slave interface 106A as per round robin order. Similarly, the master interface 104A is allocated for accessing the slave interface 106A. The master interface 104A uses 2 cycles (CY1 and CY2) to complete its two 32-bit word burst transfer.

In CY3, there are no transactions to the slave interface 106A. For the slave interface 106B, the master interface 104B is granted since there is no request from a default master interface (e.g., the master interface 104C). Pending transaction status against the slave interface 106B is incremented as transactions issued in CY2 are not absorbed immediately. Similarly, pending transaction status is incremented in CY4 to 2, because transaction issued in CY3 is also not absorbed immediately due to already pending transaction. Since there is no request from default master in CY3 to CY6, preferred master logic for the slave interface 106A increments the default master to next one in CY4 to CY7.

In CY4, there are no requests from the master interfaces 104A-C and the bus 108 is idle. However, there is a fresh transaction entered in the master interface 104A pipe STG0 for the slave interface 106B. In CY5, the master interface 104A is granted to access to the slave interface 106B. Since the slave interface 106B already has two pending transactions, bus is blocked for one cycle in CY5 and transaction is completed in CY6 as pending status is reduced to 1. In CY7, the master interface 104A is allocated to access the slave interface 106A as there is no request from the default master interface 104B.

As described above, since inner characteristic information is not considered, there is no efficient bus allocation. Here in CY0, if arbitration process considers the master interface 104C pipe STG0 32 bit transaction, it would have interleaved the master interface 104A and the master interface 104C transactions data in CY1 by allocating bus to the master interface 104B in CY0. This saves bandwidth usage by one 64 bit word (two un-used 32 bit words in CY0 and CY2). Here if arbitration process does a feedback to the master interface 104A in CY0, to combine two 32-bit word burst transfer to single 64 bit word transfer, one cycle (64 bit word) bus bandwidth would have been saved. In CY4, if arbitration process informs S1's zero transaction acceptability status to the master interface 104A, the master interface 104A could have reconsidered sending S0 transaction prior to S1. This would save 1 cycle bandwidth (64-bit word) in CY5.

Figure 3:
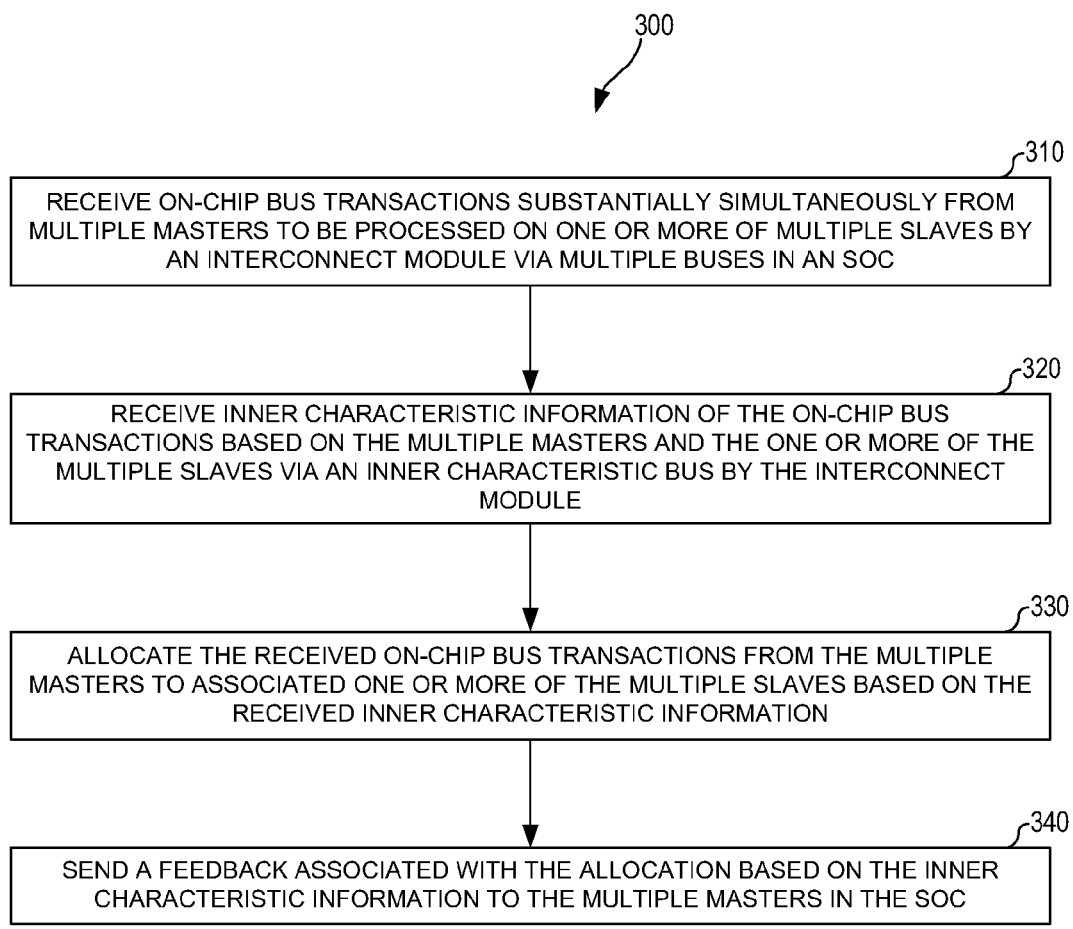
FIG. 3 illustrates a method for allocating on-chip bus transactions in an SoC, according to one embodiment.

FIG. 3 illustrates a method 300 for allocating on-chip bus transactions in an SoC, according to one embodiment. The SoC includes multiple masters, multiple slaves and an interconnect module (e.g., the interconnect module 402 of FIG. 4). The multiple masters and the multiple slaves are connected to the interconnect module via multiple buses. Further, the multiple masters, the multiple slaves and the interconnect module are coupled via an inner characteristic bus (e.g., the inner characteristic bus 414 of FIG. 4).

At step 310, on-chip bus transactions are received substantially simultaneously from the multiple masters to be processed on one or more of the multiple slaves by an interconnect module via the multiple buses. At step 320, inner characteristic information of the on-chip bus transactions based on the multiple masters and the one or more of the multiple slaves is received via the inner characteristic bus by the interconnect module. For example, the inner characteristic information includes transaction information associated with a current clock, transaction information associated with one or more subsequent clocks based on the current clock, and transaction information such as transfer size, data width, protection information, first in first out (FIFO) fill or empty level.

At step 330, the received on-chip bus transactions from the multiple masters are allocated to associated one or more of the multiple slaves based on the inner characteristic information of the on-chip bus transactions by the interconnect module. At step 340, a feedback associated with the allocation based on the inner characteristic information is sent to the multiple masters in the SoC. The feedback includes but not limited to information such as transaction optimization associated with the multiple masters, slave transaction acceptance, and so on.

Figure 4:
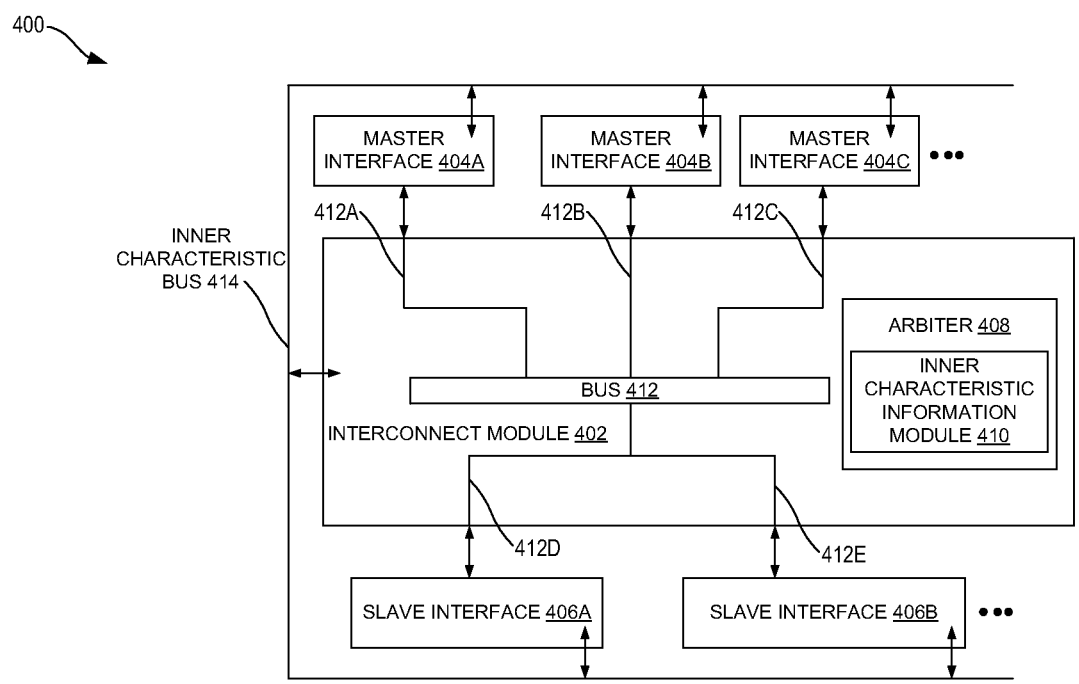
FIG. 4 illustrates a closed loop dynamic interconnect architecture of the SoC, according to one embodiment.

FIG. 4 illustrates a closed loop dynamic interconnect architecture 400 of an SoC, according to one embodiment. As shown, FIG. 4 includes an interconnect module 402 with three master interfaces 404A-C and two slave interfaces 406A-B. The master interfaces 404A-C and the slave interfaces 406A-B interact with each other using multiple buses 412A-E, as shown in the figure. Each of the master interfaces 404A-C has a pipeline depth of two internally. Similarly, each of the slave interfaces 406A-B support buffering of up to two pending transactions. The interconnect module 402 operates on 64 bit data width and supports transaction flow to both the slave interfaces 406A-B in parallel.

As illustrated, the master interfaces 404A-C, the slave interfaces 406A-B and the interconnect module 402 are connected to an inner characteristic bus 414 for obtaining the inner characteristic information of the master interfaces 404A-C and the slave interfaces 406A-B. The inner characteristic information is used for allocating bus bandwidth between the master interfaces 404A-C and the slave interfaces 406A-B. For example, an inner characteristic module 410 in an arbiter 408 of the interconnect module 402 receives the inner characteristic information from the inner characteristic bus 414. Based on the received inner characteristic information, the multiple masters 404A-C are allocated to one or more of the multiple slaves 406A-B in the SoC.

FIG. 5 illustrates the on-chip bus transactions allocation 500 using the closed loop dynamic interconnect architecture 400 of the SoC shown in FIG. 4, according to one embodiment. In particular, FIG. 5 shows bus allocation with feedback control to master and slave interfaces by considering their inner characteristic information. For example, arbitration performs bus allocation by considering interface inner characteristic information along with transaction requests. According to an embodiment of the present subject matter, the inner characteristic information module 410 receives the inner characteristic information of the on-chip bus transactions based on the multiple masters 404A-C and the multiple slaves 406A-B via the inner characteristic bus 414.

In CY0, a master interface 404A and a master interface 404B are competing for access to a slave interface 406A. The master interface 404A is requesting for a 32 bit transaction and the master interface 404B is requesting for a 64 bit transaction. Since master interface 404C pipe STG0 has '32 bit transaction to slave interface 406A', and this may be interleaved with transaction of the master interface 404A, the master interface 404B is allocated to access the slave interface 406A. The master interface 404C is the only master requesting for the slave interface 406B and it is allocated.

In CY1, the master interface 404A and the master interface 404C are both requesting for 32 bit access. Both transactions data are interleaved and passed on to the slave interface 406A for 64 bit access. The master interface 404B is allocated to perform 64 bit access to the slave interface 406B. In CY1, the master interface 404A pipe STG0 includes a two 32 bit word burst transaction to the slave interface 406B. Since, the slave interface 406B supports 64 word data, the master interface 404A is informed to combine two 32 bit word burst transaction to one 64 word single transaction. The transaction is converted from 32 bit burst transaction to 64 bit single transaction when the master interface 404A STG0 transaction in CY1 is moved in pipeline to STG1 in CY2. In CY2, a 64 bit transaction is transferred from the master interface 404A to the slave interface 406B. Transactions issued in CY1 and CY2 to S1 are not absorbed immediately, hence, pending transaction status is incremented to 1 and 2 in CY2 and CY3.

In CY3 and CY4, bus is idle because of no requests from the master interfaces 404A-C. In CY4, a fresh transaction to the slave interface 406B is entered in the master interface 404A pipe STG0. In the same cycle, arbitration process informs the master interface 404A about zero transaction acceptability status of the slave interface 406B. Because of this, in CY5, the master interface 404A continues to keep transaction of the slave interface 406B at pipe STG0, and bypasses subsequent transaction of the slave interface 406A to pipe STG1.

In CY5, the master interface 404A is allocated to access the slave interface 406A. Since no more transactions are pending on the master interface 404A apart from transaction of the slave interface 406B, it is pushed to pipe STG1 in CY6. In the same cycle CY6, transaction pending status in the slave interface 406B is reduced from 2 to 1 and is ready to accept new transactions. Hence, transaction of the master interface 404A is successfully serviced in CY6. The bus bandwidth is allocated by reducing redundancy (e.g., 3×64 words) compared to traditional one.

Figure 6:
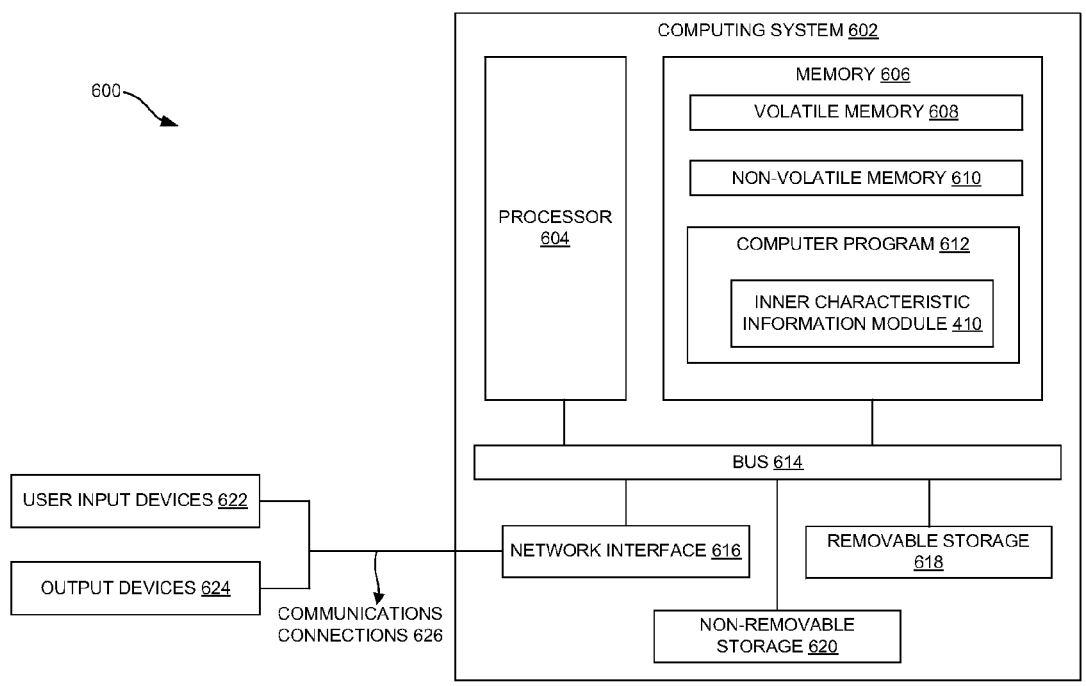
FIG. 6 illustrates an example of a suitable computing system environment for implementing embodiments of the present subject matter.

FIG. 6 shows an example of a suitable computing system environment 600 for implementing embodiments of the present subject matter. FIG. 6 and the following discussion are intended to provide a brief, general description of a suitable computing environment in which certain embodiments of the inventive concepts contained herein may be implemented.

A general computing system 602, in the form of a personal computer or a mobile device may include a processor 604, memory 606, a removable storage 618, and a non-removable storage 620. The computing system 602 additionally includes a bus 614 and a network interface 616. The computing system 602 may include or have access to the computing system environment 600 that includes one or more user input devices 622, one or more output devices 624, and one or more communication connections 626 such as a network interface card or a universal serial bus connection.

The one or more user input devices 622 may be a digitizer screen and a stylus, trackball, keyboard, keypad, mouse, and the like. The one or more output devices 624 may be a display device of the personal computer or the mobile device. The communication connections 626 may include a local area network, a wide area network, and/or other networks.

The memory 606 may include volatile memory 608 and non-volatile memory 610. A variety of computer-readable storage media may be stored in and accessed from the memory elements of the computing device 602, such as the volatile memory 608 and the non-volatile memory 610, the removable storage 618 and the non-removable storage 620. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the computing system 602. For example, a computer program 612 may include machine-readable instructions capable of allocating on-chip bus transactions between multiple masters and multiple slaves in an SoC using inner characteristic information, according to the teachings and herein described embodiments of the present subject matter. In one embodiment, the computer program 612 may be included on a compact disk-read only memory (CD-ROM) and loaded from the CD-ROM to a hard drive in the non-volatile memory 610. The machine-readable instructions may cause the computing system 602 to encode according to the various embodiments of the present subject matter.

As shown, the computer program 612 includes the inner characteristic information module 410. For example, the inner characteristic information module 410 may be in the form of instructions stored on a non-transitory computer-readable storage medium. The non-transitory computer-readable storage medium having the instructions that, when executed by the computing system 602, may cause the computing system 602 to perform the one or more methods described in FIGS. 1 through 6.

In various embodiments, the systems and methods described in FIGS. 1 through 6 improves utilization of interconnect bandwidth, reduces system frequency for given bandwidth requirements, and reduces dynamic power consumption due to reduced frequency.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for allocating on chip bus transactions between multiple masters and one or more of multiple slaves in a system on chip (SoC) using inner characteristic information of the on chip bus transactions based on the multiple masters and the multiple slaves, wherein:
    the SoC includes the multiple masters, the multiple slaves, and an interconnect module;
    the multiple masters and the multiple slaves are connected to the interconnect module via multiple buses;
    the multiple masters, the multiple slaves, and the interconnect module are further coupled via an inner characteristic bus, wherein the inner characteristic bus is separate from the multiple buses in the SoC, and the inner characteristic bus does not convey any of the on chip bus transactions from any of the multiple masters; and
    allocating the on chip bus transactions comprises:
    the interconnect module receiving, via the multiple buses, the on chip bus transactions substantially simultaneously from the multiple masters to be processed on one or more of the multiple slaves;
    the interconnect module receiving, via the inner characteristic bus, inner characteristic information of the on chip bus transactions based on the multiple masters and the one or more of the multiple slaves; and
    the interconnect module allocating the received on chip bus transactions from the multiple masters to associate one or more of the multiple slaves based on the received inner characteristic information of the on chip bus transactions.

2. The method of claim 1, wherein the multiple buses include different bus protocols.

3. The method of claim 1, wherein the inner characteristic information comprises parameters selected from the group consisting of (i) transaction information associated with a current clock, (ii) transaction information associated with one or more subsequent clocks based on the current clock, (iii) transfer size, (iv) data width, (v) protection information, and (vi) first in first out (FIFO) fill or empty level associated with the transaction.

4. The method of claim 1, further comprising the interconnect module sending feedback associated with the allocation based on the inner characteristic information to the multiple masters and the one or more slaves in the SoC.

5. The method of claim 4, wherein the feedback comprises information selected from the group consisting of (i) transaction optimization associated with the multiple masters and (ii) slave transaction acceptance.

6. A non transitory computer readable storage medium for allocating on chip bus transactions between multiple masters and multiple slaves via multiple buses in an SoC, having instructions that, when executed by a computing device causes the computing device to perform a method comprising:
    receiving the on chip bus transactions substantially simultaneously from the multiple masters to be processed on one or more of the multiple slaves by an interconnect module via the multiple buses;
    receiving inner characteristic information of the on chip bus transactions based on the multiple masters and the one or more of the multiple slaves via an inner characteristic bus by the interconnect module, wherein the inner characteristic bus is separate from the multiple buses in the SoC, and the inner characteristic bus does not convey any of the on chip bus transactions from any of the multiple masters; and
    allocating the received on chip bus transactions from the multiple masters to associate one or more of the multiple slaves based on the received inner characteristic information of the on chip bus transactions by the interconnect module.

7. The non transitory computer readable storage medium of claim 6, wherein the inner characteristic information comprises parameters selected from the group consisting of (i) transaction information associated with a current clock, (ii) transaction information associated with one or more subsequent clocks based on the current clock, (iii) transfer size, (iv) data width, (v) protection information, and (vi) FIFO fill or empty level associated with the transaction.

8. The non transitory computer readable storage medium of claim 6, further comprising sending feedback associated with the allocation based on the inner characteristic information to the multiple masters and the one or more slaves in the SoC.

9. The non transitory computer readable storage medium of claim 8, wherein the feedback comprises information selected from the group consisting of (i) transaction optimization associated with the multiple masters and (ii) slave transaction acceptance.

10. The non-transitory computer-readable storage medium of claim 6, wherein the multiple buses include different bus protocols.

11. An SoC, comprising:
    multiple masters;
    multiple slaves;
    multiple buses;
    an interconnect module coupled to the multiple masters and the multiple slaves via the multiple buses; and
    an inner characteristic bus coupled to the multiple masters, the multiple slaves and the interconnect module, wherein the interconnect module receives on chip bus transactions substantially simultaneously from the multiple masters to be processed on one or more of the multiple slaves via the multiple buses, wherein the inner characteristic bus is separate from the multiple buses in the SoC, and the inner characteristic bus does not convey any of the on chip bus transactions from any of the multiple masters, wherein the interconnect module receives inner characteristic information of the on chip bus transactions based on the multiple masters and the one or more of the multiple slaves via the inner characteristic bus, and wherein the interconnect module allocates the received on chip bus transactions from the multiple masters to associate one or more of the multiple slaves based on the received inner characteristic information of the on chip bus transactions.

12. The SoC of claim 11, wherein the interconnect module comprises an arbiter.

13. The SoC of claim 12, wherein the arbiter comprises an inner characteristic information module capable of receiving the inner characteristic information of the on chip bus transactions based on the multiple masters and the one or more of the multiple slaves via the inner characteristic bus.

14. The SoC of claim 11, wherein the multiple buses include different bus protocols.

15. The SoC of claim 11, wherein the inner characteristic information comprises parameters selected from the group consisting of (i) transaction information associated with a current clock, (ii) transaction information associated with one or more subsequent clocks based on the current clock, (iii) transfer size, (iv) data width, (v) protection information, and (vi) FIFO fill or empty level associated with the transaction.

16. The SoC of claim 11, wherein the interconnect module sends feedback associated with the allocation based on the inner characteristic information to the multiple masters and the one or more slaves in the SoC.

* * * * *